(12) United States Patent
Packard, III

(10) Patent No.: US 7,762,042 B2
(45) Date of Patent: Jul. 27, 2010

(54) WIREWAY QUICK-CONNECT SYSTEM

(75) Inventor: Duan E. Packard, III, Sherman, TX (US)

(73) Assignee: Cooper Technologies Company, Houston, TX (US)

( * ) Notice: Subject to any disclaimer, the term of this patent is extended or adjusted under 35 U.S.C. 154(b) by 439 days.

(21) Appl. No.: 11/741,752

(22) Filed: Apr. 29, 2007

(65) Prior Publication Data

US 2008/0263977 A1    Oct. 30, 2008

(51) Int. Cl.
| | |
|---|---|
| E04C 2/52 | (2006.01) |
| H02G 3/04 | (2006.01) |
| H02G 3/06 | (2006.01) |
| H02G 3/38 | (2006.01) |
| F16G 11/00 | (2006.01) |

(52) U.S. Cl. .................. 52/848; 174/68.1; 174/68.3; 403/294; 403/300; 403/306; 52/220.1; 52/849; 52/726.1; 52/582.1; 52/220.7; 439/207; 285/149.1

(58) Field of Classification Search .................. 52/220.5, 52/220.7, 263, 582.2, 831, 836, 844, 848, 52/220.1, 220.3; 403/292, 361, 286, 293, 403/13, 14, 300, 306, 362; 174/68.1, 68.3, 174/72 C, 72 A, 97, 95, 480, 481; 439/207; 248/68.1; 285/149.1, 151, 370, 396, 397, 285/402, 424

See application file for complete search history.

(56) References Cited

U.S. PATENT DOCUMENTS

| | | | | |
|---|---|---|---|---|
| 1,217,805 | A | * | 2/1917 | Meyer ........................ 285/424 |
| 1,590,569 | A | * | 6/1926 | Fisk ............................ 439/17 |
| 2,353,121 | A | * | 7/1944 | Adam et al. ................ 285/404 |
| 2,818,497 | A | * | 12/1957 | Alden ........................ 362/219 |
| 2,905,201 | A | * | 9/1959 | McNaughton .............. 138/159 |
| 2,917,083 | A | * | 12/1959 | Duvall et al. ............. 285/284.1 |
| 3,023,032 | A | * | 2/1962 | Johnston et al. .......... 285/149.1 |
| 3,161,722 | A | * | 12/1964 | Wellens et al. ............. 138/159 |
| 3,338,599 | A | * | 8/1967 | Hallman ..................... 174/68.3 |
| 3,594,966 | A | * | 7/1971 | Janic et al. ................. 52/220.5 |
| 3,633,628 | A | * | 1/1972 | Duquette et al. ............ 138/116 |
| 4,077,434 | A | * | 3/1978 | Sieckert et al. ................ 138/92 |
| 4,349,220 | A | * | 9/1982 | Carroll et al. ............... 285/424 |
| 5,013,873 | A | * | 5/1991 | Deibele et al. .............. 220/379 |
| 5,081,808 | A | * | 1/1992 | Bastian et al. ............. 52/220.7 |
| 5,144,780 | A | * | 9/1992 | Gieling et al. ................ 52/298 |
| 5,556,079 | A | * | 9/1996 | West ........................... 256/22 |

(Continued)

OTHER PUBLICATIONS

Hammond Manufacturing Enclosures, Commercial Enclosure, hammfg.com, 2 pages.

(Continued)

*Primary Examiner*—David Dunn
*Assistant Examiner*—Joseph J Sadlon
(74) *Attorney, Agent, or Firm*—Senniger Powers LLP

(57) ABSTRACT

A quick-connect system for connecting two or more sections of wireway in generally longitudinal alignment along an X-axis. The system involves the a series of screws in the bottom and side walls of a generally U-shaped connector receivable in corresponding slots in the bottom and side walls of the two wireway sections. In one embodiment, the bottom wall slots are closed-ended slots and the side wall slots are open-end slots extending in from respective end edges of the wireway sections. The side walls slots are configured such that they have longitudinal centerlines having X-axis and Y-axis components.

17 Claims, 16 Drawing Sheets

U.S. PATENT DOCUMENTS

| | | | | |
|---|---|---|---|---|
| 5,971,465 | A | * | 10/1999 | Ives et al. .................. 296/61 |
| 6,143,984 | A | * | 11/2000 | Auteri .................... 174/68.3 |
| 6,715,719 | B2 | * | 4/2004 | Nault et al. ............... 248/68.1 |
| 6,754,992 | B1 | * | 6/2004 | Byfield et al. .............. 52/36.5 |
| 6,854,233 | B2 | * | 2/2005 | Pitsch et al. .............. 52/584.1 |
| 6,909,044 | B2 | * | 6/2005 | Ewer et al. ................ 174/492 |
| 2006/0210356 | A1 | * | 9/2006 | Ferris et al. ............... 403/292 |

OTHER PUBLICATIONS

Hammond Manufacturing Enclosures, Lay In Wireway NEMA 1, catalog, pp. 16-19, admitted prior art.

Hoffman, Lay-In NEMA Type 1 Hinged Cover Wireway, Product Catalog, hoffmanonline.com, 2 pages, dated 2005.

Hoffman, Lay-In NEMA Type 3R Wireway, Product Catalog, hoffmanonline.com, 2 pages, dated 2005.

Hoffman, Lay-In NEMA Type 1 Painted Flat Cover Wireway; 2 pages, dated Apr. 2007.

Wiegmann, HS & S Series Wireway NEMA 1 Wireway & Fittings, pp. G2-G7, admitted prior art.

Wiegmann, LJW Series NEMA 12 Lay-In Wireway & Fittings, pp. G8-G11, admitted prior art.

Wiegmann, SSJW Series NEMA 12 Stainless Feed-Through Wireway & Fittings, pp. G16-G17, admitted prior art.

Wiegmann, RSCG Series NEMA 3R Wiring Through, pp. G18-G19, dated 2003.

Wiegmann, T-CH Series NEMA 12 Hinge Cover Wiring Through, pp. G20-G21, dated 2003.

Cooper Wheelock—Enclosure Assembly Drawing, 1 page, showing admitted prior art design.

Century, UL 870 Wireways, Auxiliary gutters, and Associated Fittings, dated Jul. 16, 2003, 8 pages.

* cited by examiner

WIREWAY QUICK-CONNECT SYSTEM

BACKGROUND OF THE INVENTION

This invention relates generally to wireways for enclosing electrical conduit, wires, cable and the like ("wire"), and more particularly to an improved construction for connecting two sections of wireway.

In general, wireways are fabricated in longitudinal sections which are connected end to end in the field to provide a wireway of the desired length. The sections are connected in various ways, but conventional designs require the handling of loose hardware and tools, making the connection process inconvenient and time-consuming, especially where the wireway is mounted on elevated surface requiring the worker to stand on a ladder or other elevated support. There is a need, therefore, for an improved wireway connection design.

SUMMARY OF THE INVENTION

In general, one embodiment of the present invention is directed to a quick-connect system for connecting sections of wireway. The system comprises first and second wireway sections, each wireway section having a length along an X-axis, a height along a Y-axis and a width along a Z-axis. The system also includes a connector for connecting the first and second wireway sections in generally longitudinal alignment along the X-axis. The connector has a length along the X-axis, a height along the Y-axis and a width along the Z-axis. Further, the connector comprises a bottom wall and opposing side walls configured to overlap adjacent ends of the first and second wireway sections, and at least one set of two spaced apart and longitudinally aligned screw holes in each of the bottom and side walls of the connector for receiving connector screws. Each of the first and second wireway sections comprises a bottom wall and at least one bottom wall slot in the bottom wall of the section generally adjacent a first end of the section for receiving a respective connector screw. The at least one bottom wall slot comprises a first portion toward the first end of the section for receiving a head of the connector screw and a second portion farther away from the first end of the section for receiving a shank of the screw. Each wireway section also includes a pair of side walls extending up from the bottom wall, and at least one side wall slot in each side wall generally adjacent the first end of the section for receiving a shank of a respective connector screw. The at least one side wall slot extends from an end edge of the side wall and is configured such that a longitudinal centerline of the slot has both X-axis and Y-axis components.

In another aspect, this invention is directed to a wireway section having a length along an X-axis, a height along a Y-axis and a width along a Z-axis. The wireway section comprises a bottom wall and at least one bottom wall slot in the bottom wall of the section for receiving a respective screw of a connector. The bottom wall slot comprises a wider portion adjacent a first end of the section for receiving a head of the screw and a narrower portion farther away from the first end of the section for receiving a shank of the screw. The wireway section also includes a pair of side walls extending up from the bottom wall, and at least one side wall slot in each side wall for receiving a shank of a respective connector screw. The at least one side wall slot extends from an end edge of the side wall and is configured such that a longitudinal centerline of the slot has both X-axis and Y-axis components.

In another aspect, this invention is directed to a wireway section comprising a bottom wall and at least one bottom wall slot in the bottom wall of the section generally adjacent a first end of the section for receiving a screw of a connector adapted to connect the wireway section to an adjacent wireway section. The at least one bottom wall slot comprises a wider portion toward the first end of the section for receiving a head of the screw and a narrower portion farther away from the first end of the section for receiving a shank of the screw. The wireway section further comprises a pair of side walls extending up from the bottom wall of the wireway and at least one open-end side wall slot in each side wall adjacent the first end of the section for receiving the shanks of screws of the connector. The at least one open-end side wall slot extends from a first location at an edge of the side wall to a second location closer to the bottom wall.

In another aspect, this invention is directed to a method of connecting first and second wireway sections. Each wireway section has a length along an X-axis, a height along a Y-axis and a width along a Z-axis. The method comprises the steps of: (a) aligning a first set of side wall screws adjacent a first end of a connector with a first set of side wall slots in the first wireway section, each side wall slot extending from a sidewall edge of the wireway section; (b) telescoping the connector into the first wireway section first by moving the side wall screws along lengths of respective side wall slots having X-axis and Y-axis components to bring a first bottom wall screw on the connector into a bottom wall slot in the bottom of the first wireway section; (c) tightening the side wall screws of the first set and the first bottom wall screw to fasten the connector to the first wireway section; (d) aligning a second set of side wall screws adjacent a second end of a connector with a second set of corresponding side wall slots in the second wireway section, each side wall slot extending from a sidewall edge of the second wireway section; (e) telescoping the connector into the second wireway section first by moving the side wall screws of the second set along lengths of respective side wall slots having X-axis and Y-axis components to bring a second bottom wall screw on the connector into a bottom wall slot in the bottom of the wireway section; and (f) tightening the side wall screws of the second set and the second bottom wall screw to fasten the connector to the second wireway section.

Other objects and features will be in part apparent and in part pointed out hereinafter.

BRIEF DESCRIPTION OF THE DRAWINGS

Corresponding parts are designated by corresponding reference numbers throughout the drawings.

DETAILED DESCRIPTION

Figure 1:
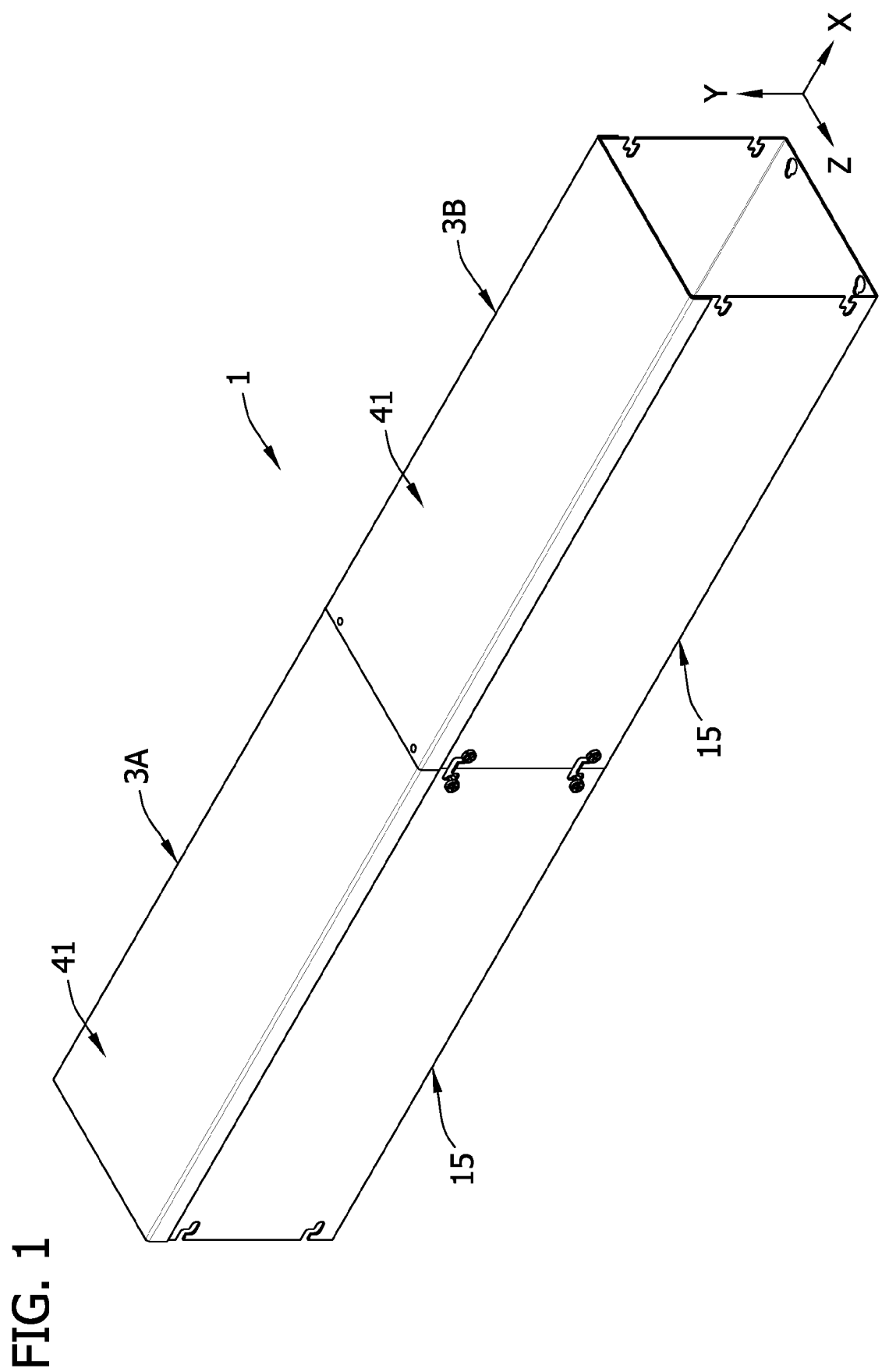
FIG. 1 is a top perspective of two wireway sections connected using a quick-connect system of the present invention.
Figure 2:
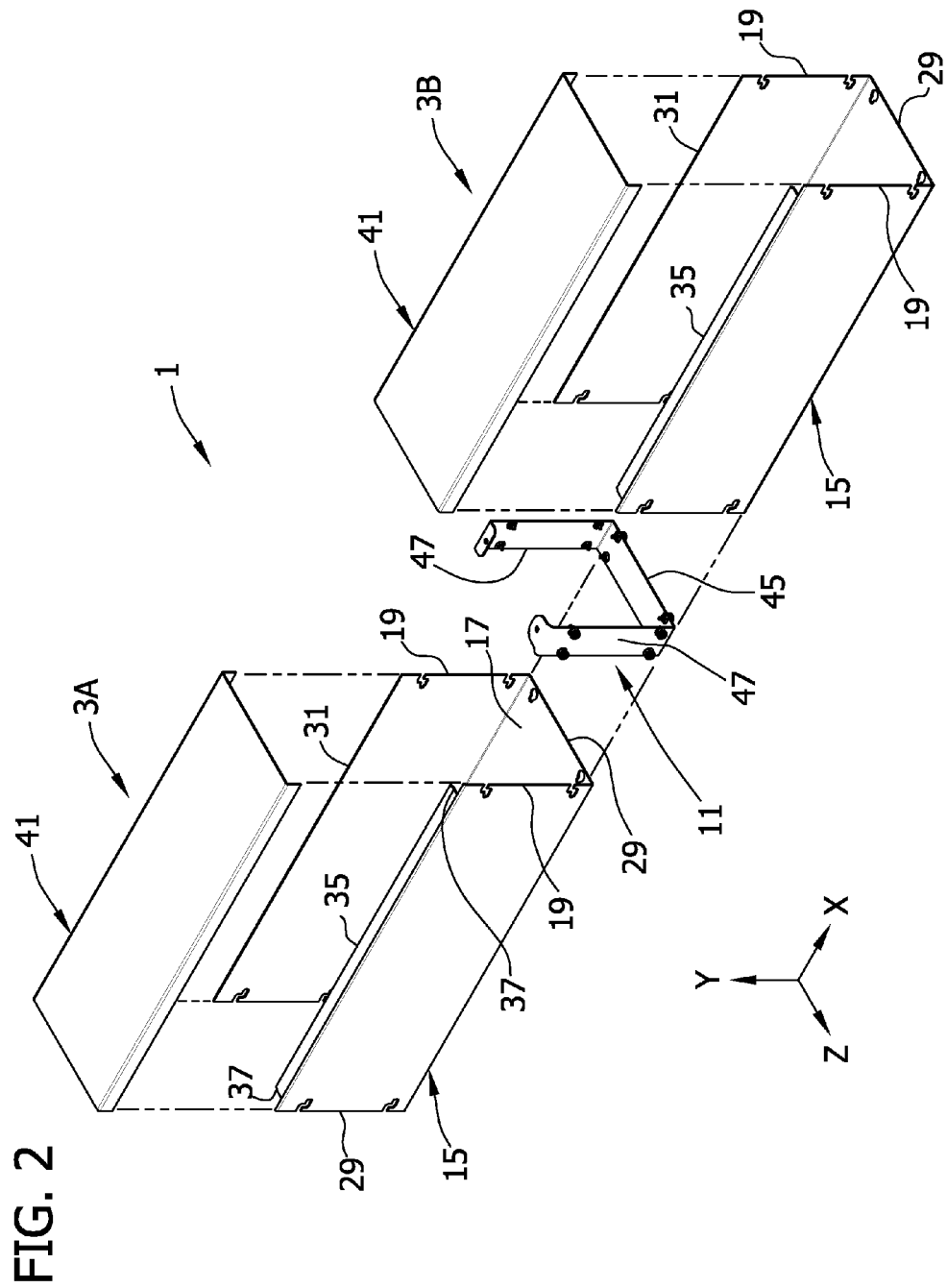
FIG. 2 is a view similar to FIG. 1 but showing the parts of the quick-connect system exploded apart.

Referring now to the drawings, and first to FIGS. 1 and 2, one embodiment of a quick-connect system of the present invention is indicated its entirety by the reference numeral 1. The system comprises first and second wireway sections, generally designated 3A and 3B. Each section has a length along an X-axis, a height along a Y-axis and a width along a Z-axis (see FIG. 1). Each section defines an interior space for placement of wire, as will be understood by those skilled in this field. The system also includes a connector, generally designated 11 (FIG. 2), for connecting the wireway sections 3A, 3B in generally longitudinal alignment along the X-axis. While only two sections are illustrated, any number of sections can be connected using the system of this invention to form a wireway of desired length. The components of the quick-connect system 1 are described in greater detail below. For convenience, dimensions along the X, Y and Z axes will be referred to herein as "X" dimensions, "Y" dimensions and "Z" dimensions, respectively.

In general, each wireway section 3A, 3B comprises an elongate channel-shaped body 15 having a bottom wall 17, generally parallel first and second side walls 19 extending up from the bottom wall 17, and opposite first and second ends, each of which terminates in an end edge 29. One side wall 19 of the body 3 terminates in an upper edge 31 extending longitudinally of the section. The other side wall 23 has an in-turned flange 35 along its upper edge. The flange 35 has opposite end edges 37 spaced from respective end edges 29 of the body 15. The body has suitable X, Y and Z-dimensions. By way of example but not limitation, the X-dimension of the body may range from 12-120 inches, and suitable Y/Z dimensions include 3×3, 4×4, 6×6, 8×8, 10×10, 12×12, 3×6 and 4×8 inches. In one embodiment, the wireway body 3 is of metal (e.g., 14 or 16-gauge sheet metal), but it will be understood that other materials such as plastic can be used.

The section also includes an elongate cover, generally designated 41. The cover has a length along the X-axis and a width along the Z-axis (when the cover is closed). In one embodiment, the cover 41 has a hinge connection (not shown) with the first or second side wall 19 of the body 15 for swinging between open and closed positions about an axis extending lengthwise of the body. In other embodiments, the cover may have no hinge connection. For example, the cover may be secured in place with screws or other mechanisms which, when removed or released, allow the cover to be removed from the body. The cover 41 can be fabricated from the same material as the body (e.g., sheet metal), or it can be fabricated of a different material.

Figure 3:
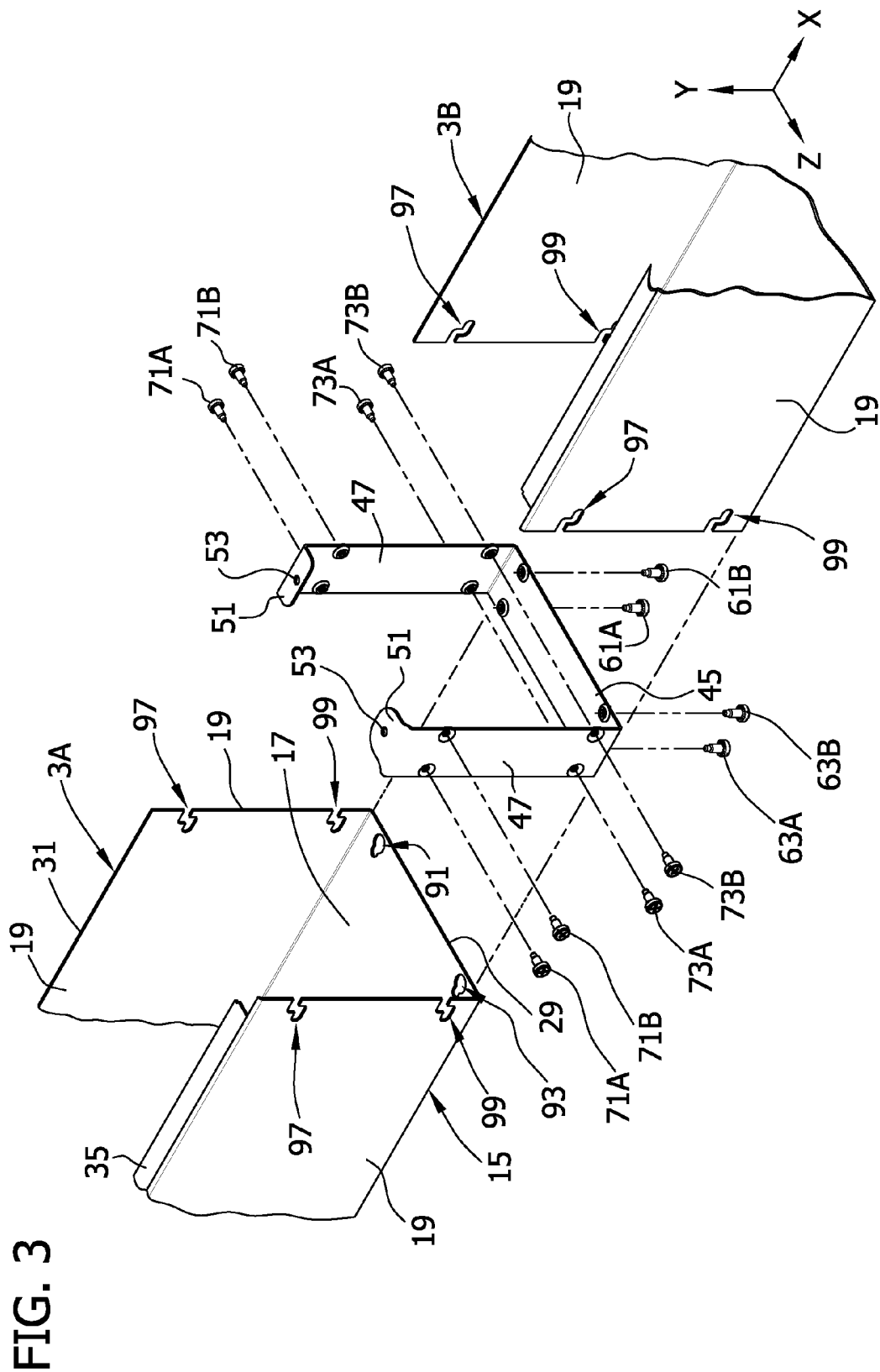
FIG. 3 is an enlarged portion of FIG. 2 showing screws removed from screw holes in a connector of this invention.

Referring to FIG. 3, the connector 11 is a generally U-shaped member comprising a bottom wall 45 and opposing side walls 47 configured to overlap adjacent ends of the first and second wireway sections 3A, 3B. Desirably, the bottom and side walls 45, 47 of the connector 11 have an exterior contour essentially identical in shape and slightly smaller in dimension than the interior contour of the bottom and side walls 17, 19 of the wireway sections 3A, 3B so that the connector can slidably moved or telescoped into adjacent ends of the sections during the connection process (to be described later). In-turned flanges 51 are formed at the upper ends of the side walls 47 of the connector 11. Each flange 51 has an opening 53 for pivotal attachment of a wire retention strap (not shown) to the flanges to assist in the retention of wire in the wireway. A series of screw holes are provided in the connector 11, as described below.

Figure 4:
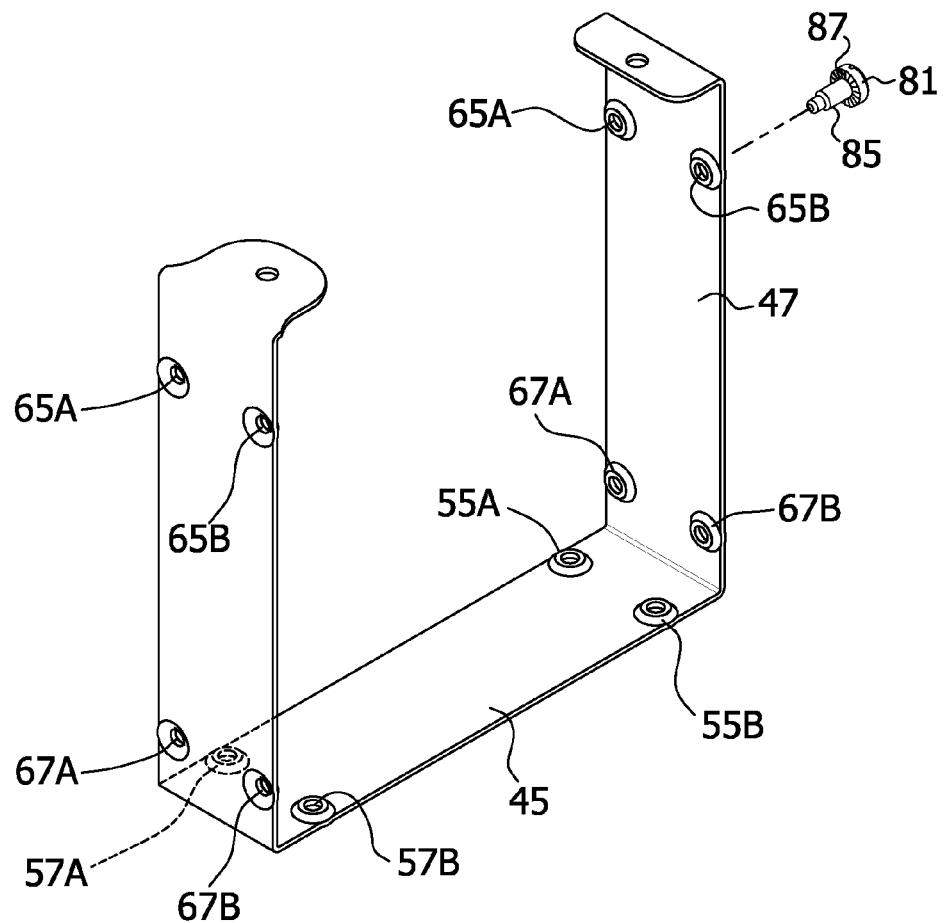
FIG. 4 is an enlarged portion of FIG. 3 showing the connector.

Referring to FIG. 4, the bottom wall 17 of the connector has two sets of bottom wall screw holes. The first set comprises two screw holes designated 55A and 55B longitudinally aligned in a direction generally parallel to the X-axis, and the second set comprises two screw holes designated 57A and 57B longitudinally aligned in a direction generally parallel to the X-axis. The two sets of bottom wall screw holes are laterally spaced along the Z-axis, the two bottom wall screw holes 55A, 55B of the first set being located toward and generally adjacent one side wall 47 of the connector and the two bottom wall screw holes 57A, 57B of the second set being located toward and generally adjacent the opposite side wall 47 of the connector. Desirably, the screw holes 55A and 57A are generally aligned in the Z-direction (i.e., a direction parallel to the Z-axis), and the screw holes 55B and 57B are generally aligned in the Z-direction. In this embodiment, the screw holes 55A, 55B, 57A, 57B are threaded for threaded engagement by respective connector screws 61A, 61B, 63A, 63B. The number of sets of bottom wall screw holes will vary depending on the overall Z-dimension of the connector. The maximum Z-spacing between adjacent sets of screw holes is generally determined by UL or other code requirements (e.g., UL 870).

Similarly, each side wall 47 of the connector 11 has two sets of side wall screw holes generally adjacent the upper and lower ends of the side wall. The first set comprises two upper screw holes designated 65A and 65B longitudinally aligned in a direction generally parallel to the X-axis, and the second set comprises two lower screw holes designated 67A and 67B longitudinally aligned in a direction generally parallel to the X-axis. As depicted in FIG. 4, the sets of upper and lower screw holes are spaced along the Y-axis, the two upper screw holes 55A, 55B being located toward and generally adjacent the upper end of each connector side wall 47 and the two lower screw holes being located toward and generally adjacent the lower end of the connector side wall 47. Desirably, the upper and lower side wall screw holes 65A, 67A adjacent one longitudinal (X-axis) end of the connector 11 are generally aligned in the Y-direction (i.e., a direction parallel to the Y-axis), and the upper and lower side wall screw holes 65B and 67B adjacent the opposite longitudinal (X-axis) end of the connector are generally aligned in the Y-direction. In this embodiment, the screw holes 65A, 65B, 67A, 67B are threaded for threaded engagement by respective screws 71A, 71B, 73A, 73B. The number of sets of side wall screw holes in each side wall will vary depending on the overall Y-dimension of the connector. The maximum Y-spacing between adjacent sets of screw holes is generally determined by UL or other code requirements (e.g., UL 870).

As shown in FIGS. 3 and 4, each connector screw 61A, 61B, 71A, 71B, 73A, 73B, comprises a round head 81 and a smaller-diameter shank 85 extending from the head. The underside of the head 81 comprises a series of ridges 87 which function as a locking mechanism (e.g., similar to a lock washer) for inhibiting rotation of the screw after it has been tightened against a surface to prevent unintentional loosening of the screw. Further, as the screw is tightened, the ridges 9 function to remove any paint or other dielectric material from the body 15 to ensure good electrical continuity with the body for grounding purposes. Other screw configurations are possible.

The body 15 of each of the first and second wireway sections 3A, 3B is provided with a series of slots generally adjacent each end of the section for use in connecting the first and second sections to one another, as will be described.

These slots include at least one bottom wall slot in the bottom wall of the section and at least one side wall slot in each side wall of the section. In the particular embodiment of FIG. 3, the bottom wall 17 of each wireway section 3A, 3B has two bottom wall slots 91, 93 adjacent each longitudinal (X-axis) end of the section located toward and generally adjacent opposite side walls 19 of the section, and each side wall of the section has two side wall slots, namely, an upper side wall slot 97 generally adjacent the upper edge 31 of the side wall 19 and a lower side wall slot 99 generally adjacent the lower edge of the side wall. The number of bottom wall slots 91, 93 will vary depending on the overall Z-dimension of the wireway section. The maximum Z-spacing between adjacent screw holes is generally determined by UL code requirements (e.g., UL 870). Similarly, the number of side wall slots 97, 99 will vary depending on the overall Y-dimension of the wireway section. The maximum Y-spacing between the upper and lower screw holes is generally determined by UL or other code requirements (e.g., UL 870). The configurations of the bottom wall slots 91, 93 and side wall slots 97, 99 are described below.

Figure 5:
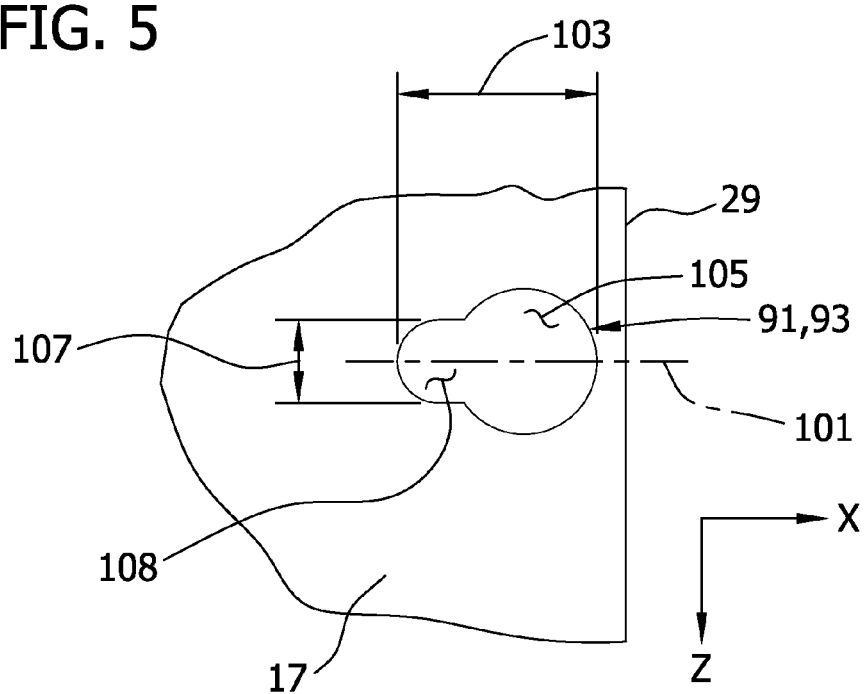
FIG. 5 is an enlarged portion of the body of a wireway section showing a slot in the bottom wall of the section.

The two bottom wall slots 91, 93 adjacent each end of the wireway section 3A, 3B are generally transversely aligned along the Z-axis. As shown in FIG. 5, each bottom wall slot 91, 93 has opposite closed ends and a longitudinal axis 101 extending generally in the X-direction. The slot has an overall length dimension 103 in the X-direction. The slot comprises a first larger-dimension portion 105 (e.g., generally circular in shape) toward a first end of the section 3A, 3B for receiving the head 81 of a corresponding bottom wall connector screw 61A, 61B, 63A, 63B and a second smaller-dimension portion 107 (e.g., a narrower linear portion) farther away from the stated first end of the section for receiving a shank 85 of the screw. The second narrower portion 103 of the slot 91, 93 has a width dimension 107 in the Z-direction less than the diameter of the head 81 of the connector screw received in the slot.

The connector 11 and wireway sections 3A, 3B are configured such that when the connector is telescoped inside adjacent ends of the wireway sections during the connection process (described later), the bottom wall connector screws 61A, 61B, 63A, 63B of the connector align along the X-axis with respective bottom wall slots 91, 93 in the wireway sections. Further, at the end of the connection process, the bottom wall connector screws are positioned in the narrower portions 107 of the slots 91, 93. As a result, when the screws are tightened down, the heads of the screws will lock down against the bottom walls 17 of the wireway bodies 15.

Figure 6:
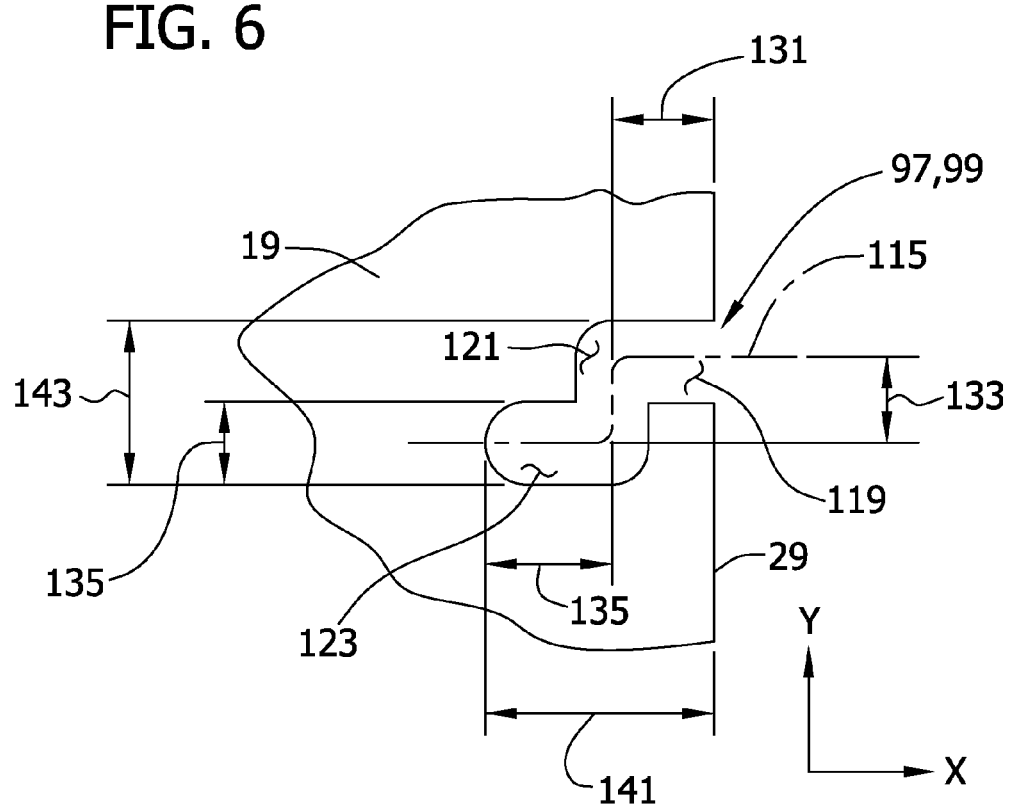
FIG. 6 is an enlarged portion of the body of a wireway section showing a slot in a side wall of the section.
Figure 7:
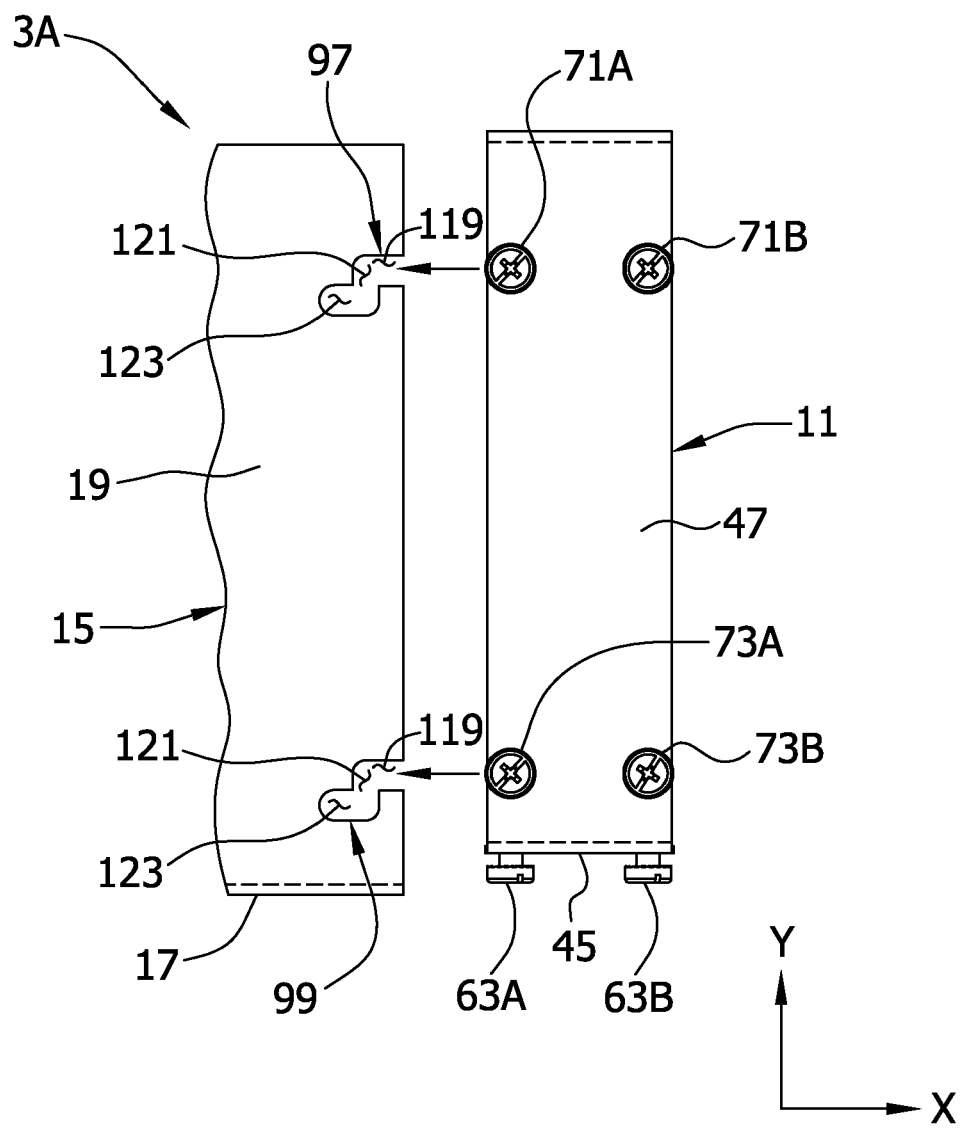
FIGS. 7-11 are side elevations of portions of the two wireway sections and the connector showing a sequence of steps for connecting the two sections using the connector.
Figure 8:
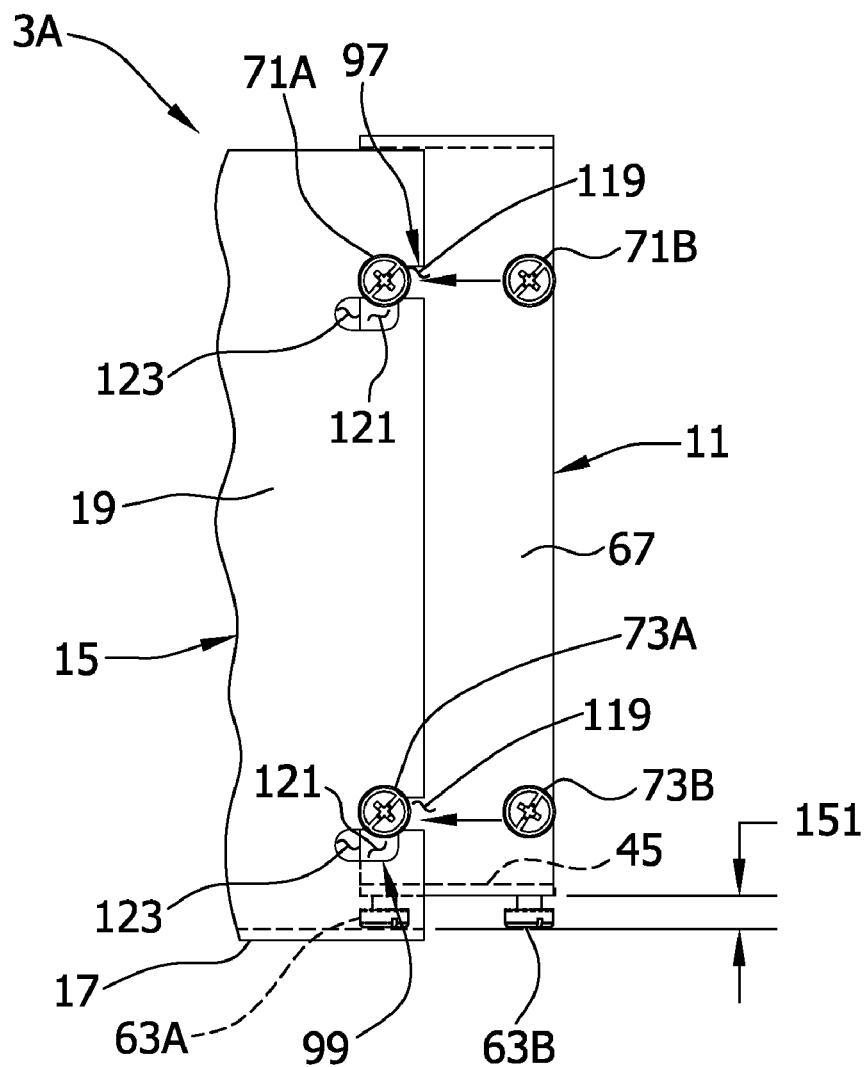
Figure 9:
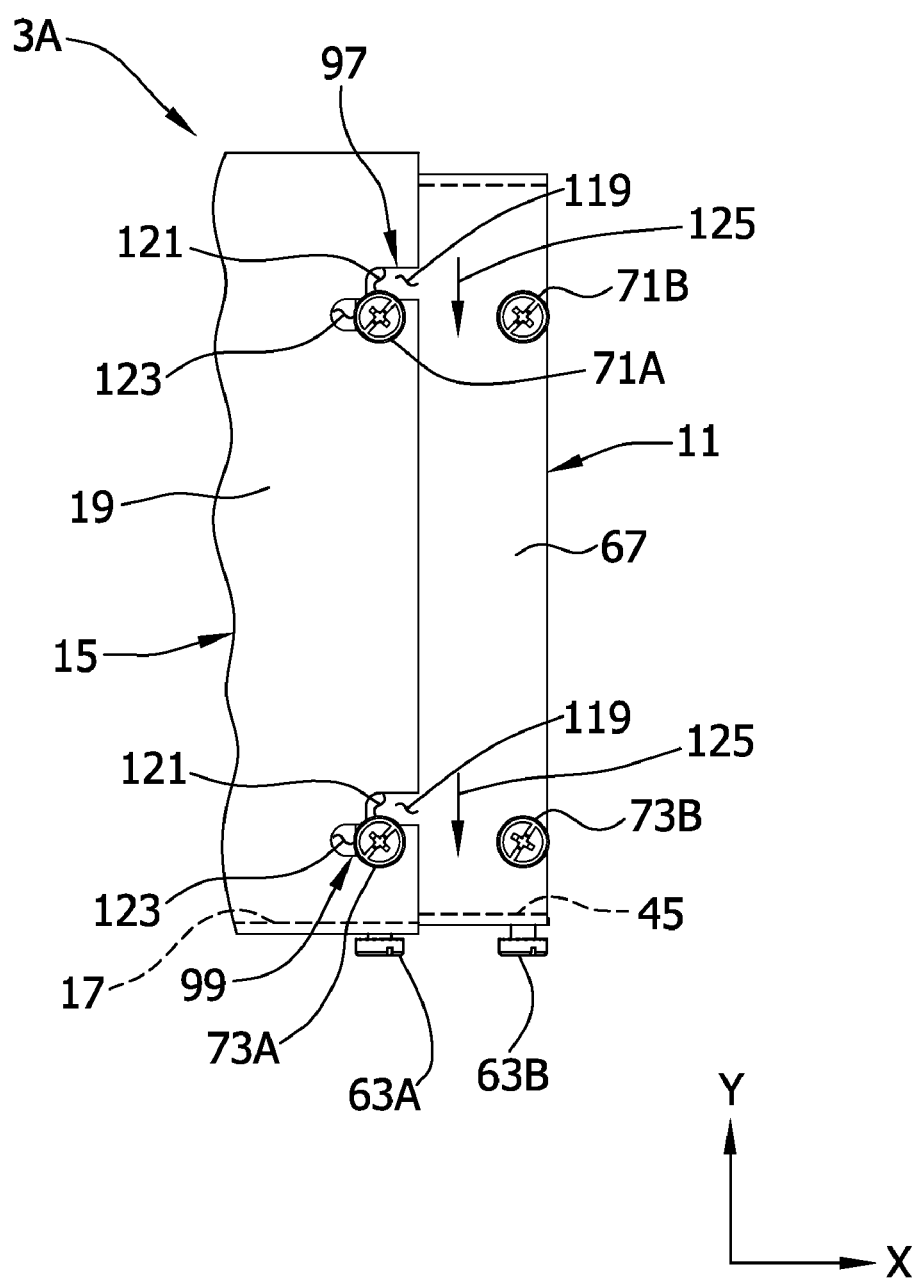
Figure 10:
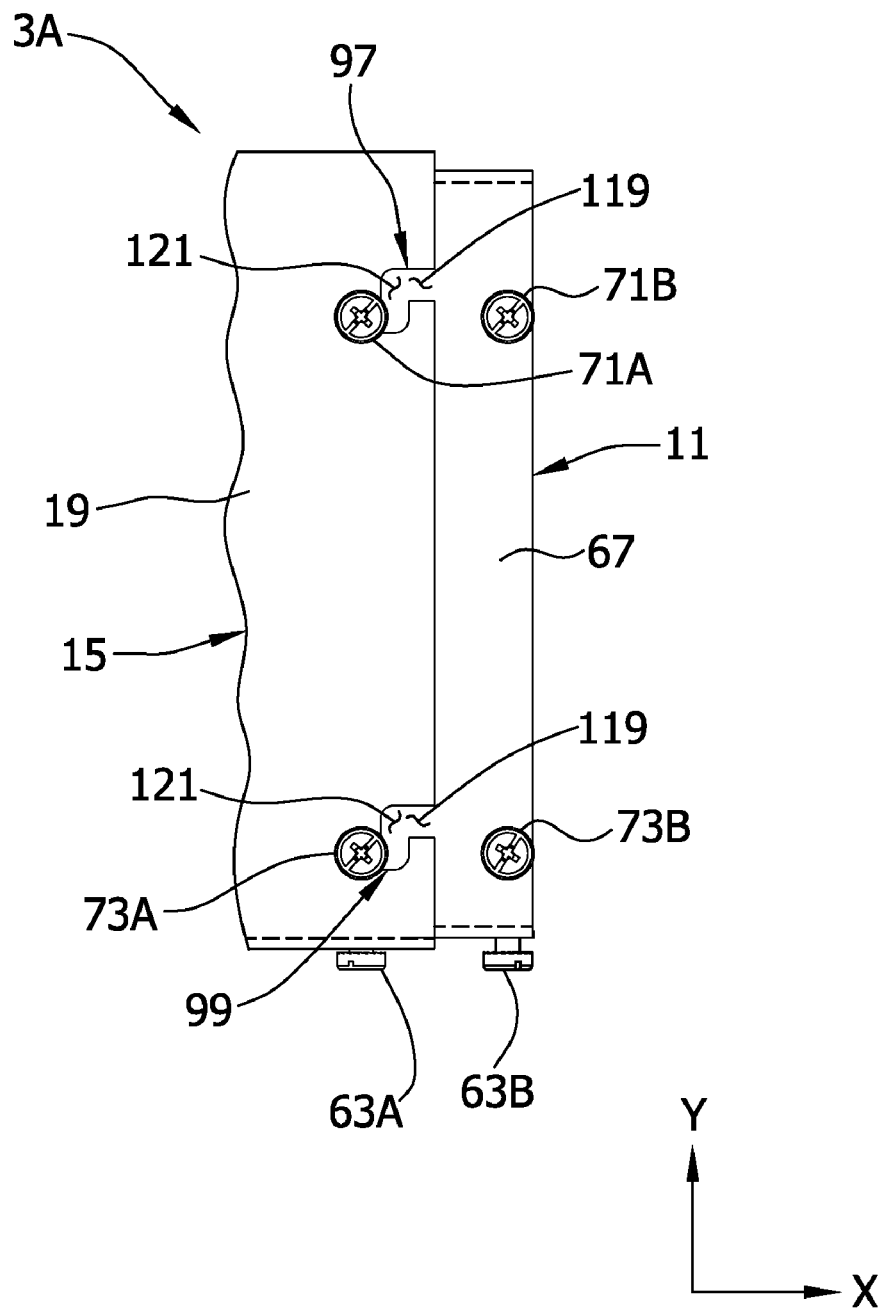
Figure 11:
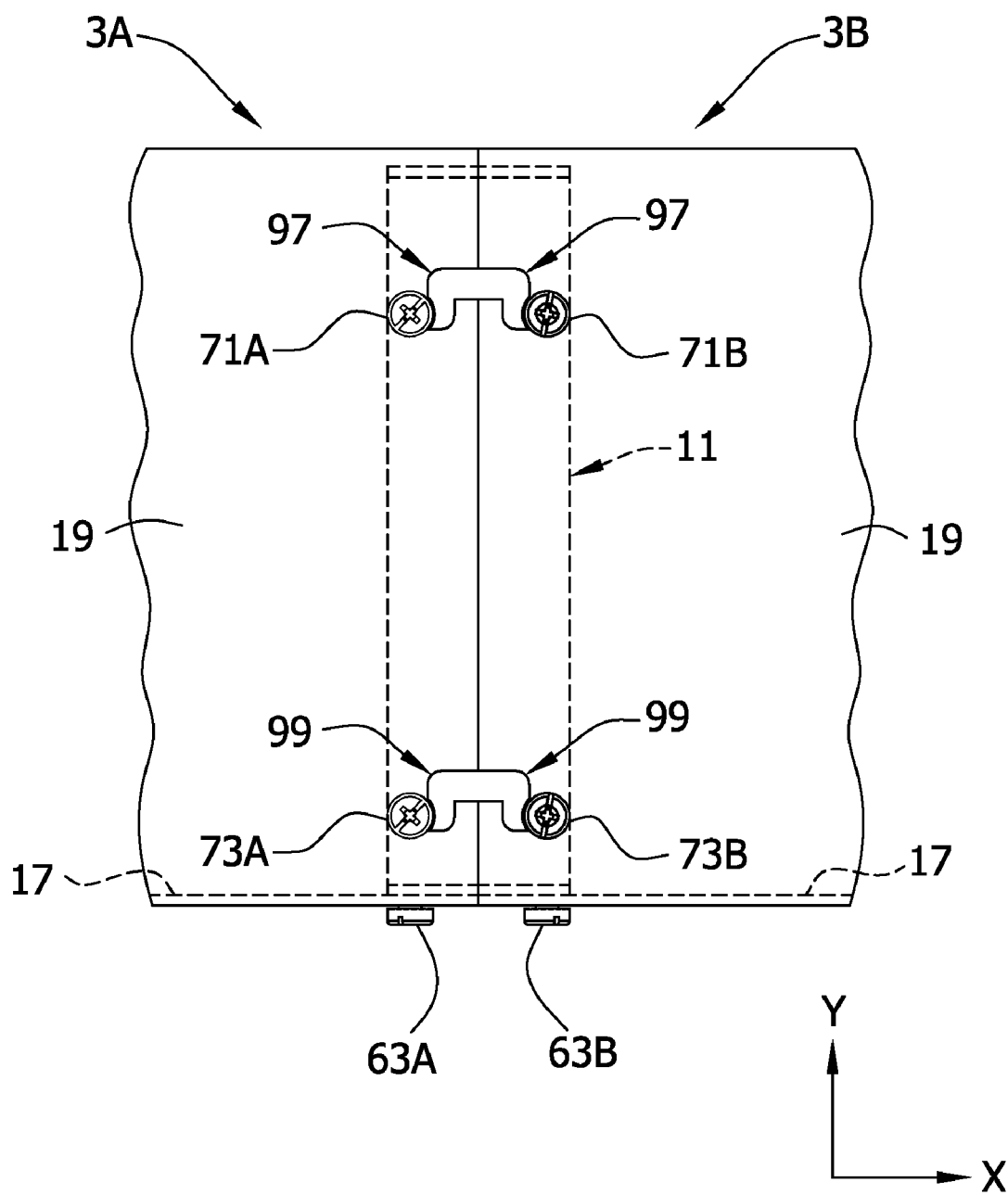
Figure 12:
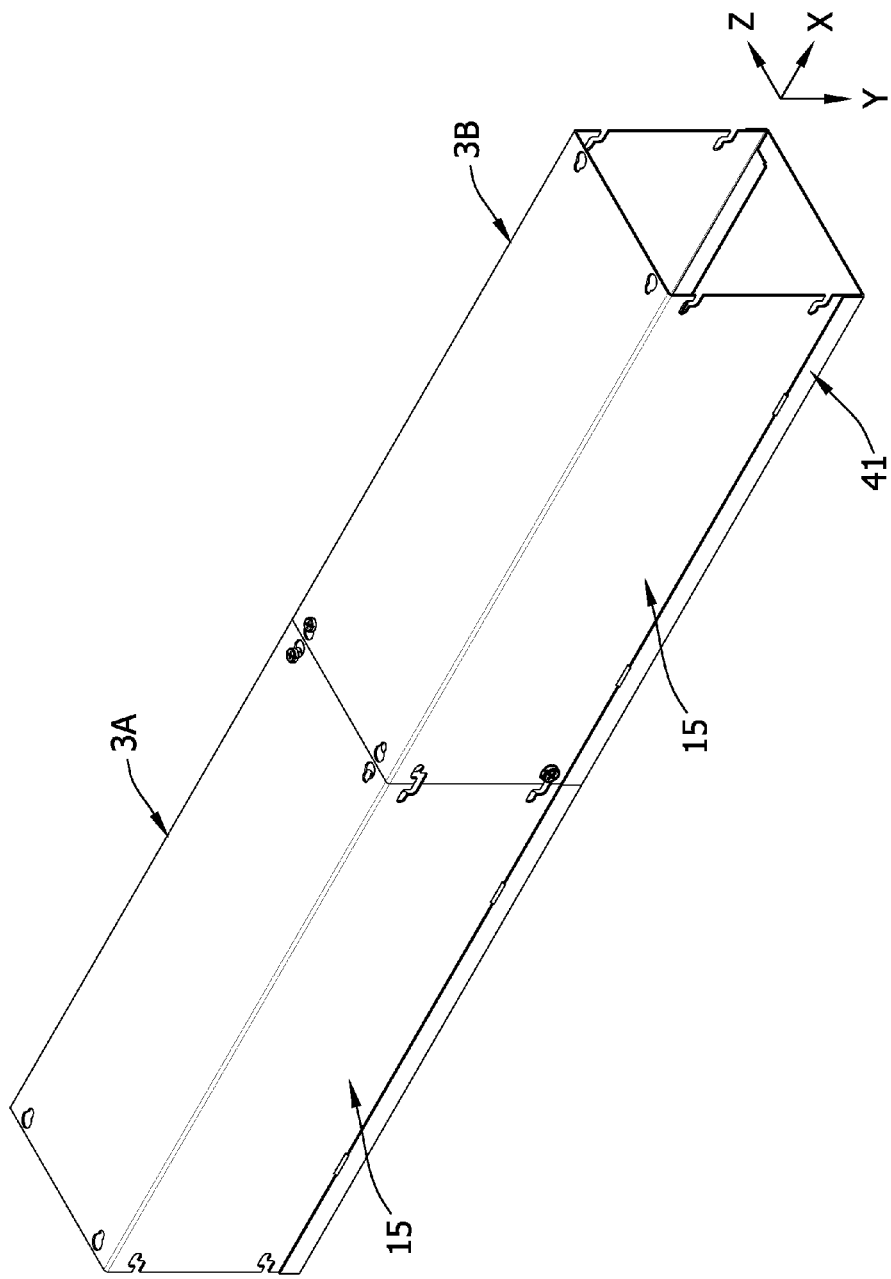
FIG. 12 is a bottom perspective of the two wireway sections shown connected to one another.
Figure 13:
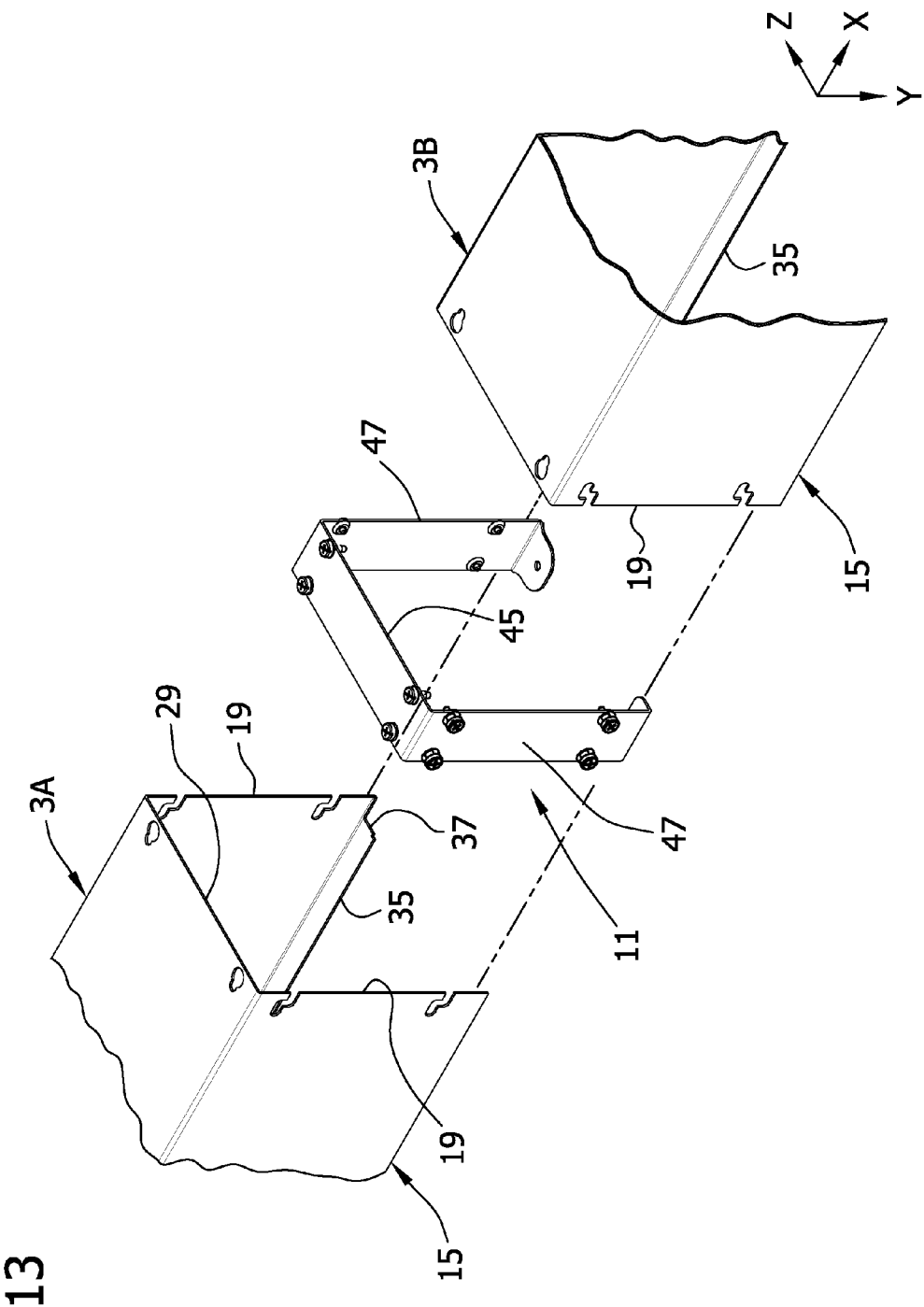
FIG. 13 is a view similar to FIG. 12 but showing the parts of the quick-connect system exploded apart.
Figure 14:
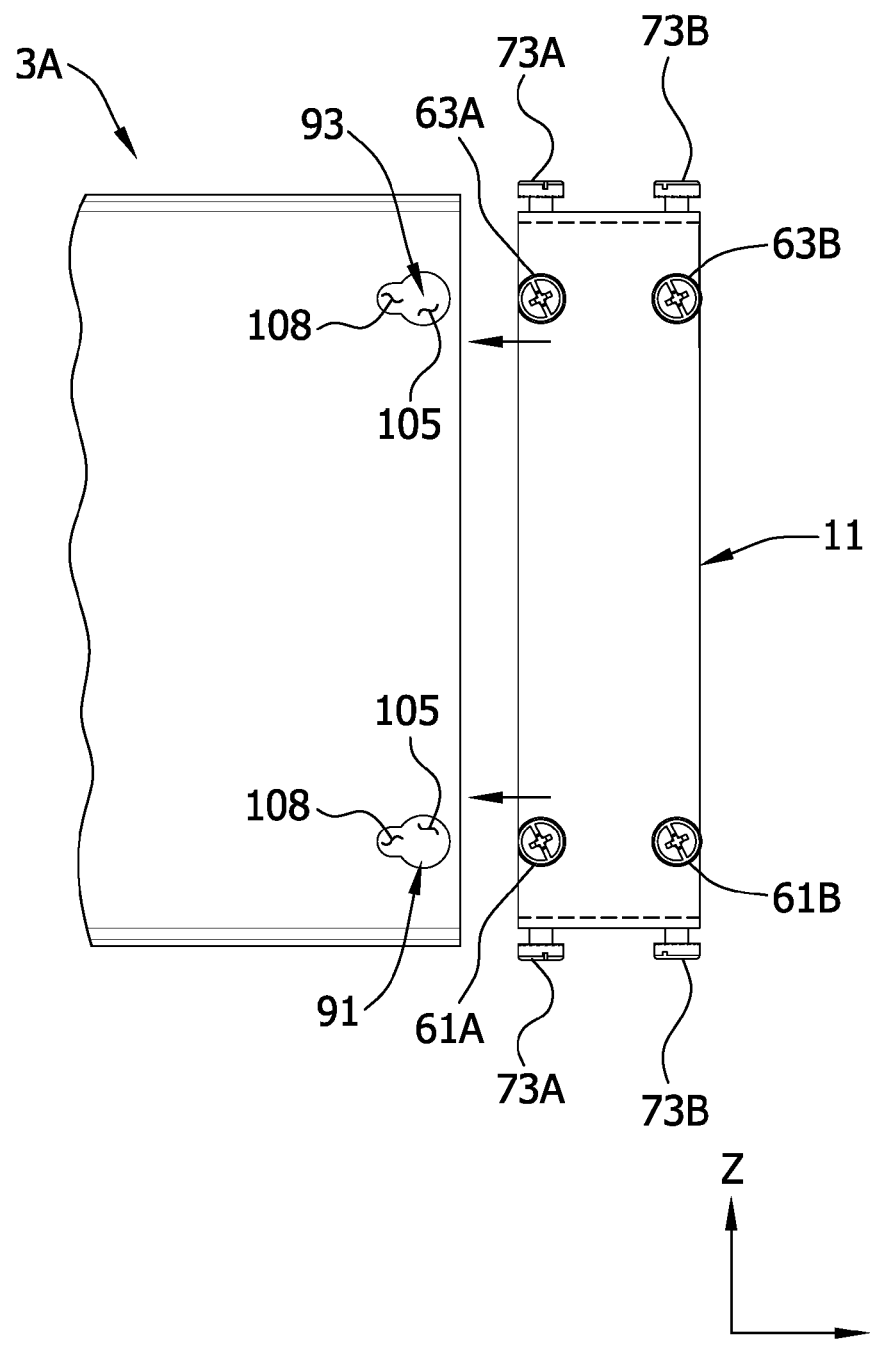
FIGS. 14-17 are partial bottom views of portions of the two wireway sections and the connector showing a sequence of steps for connecting the two sections using the connector.
Figure 15:
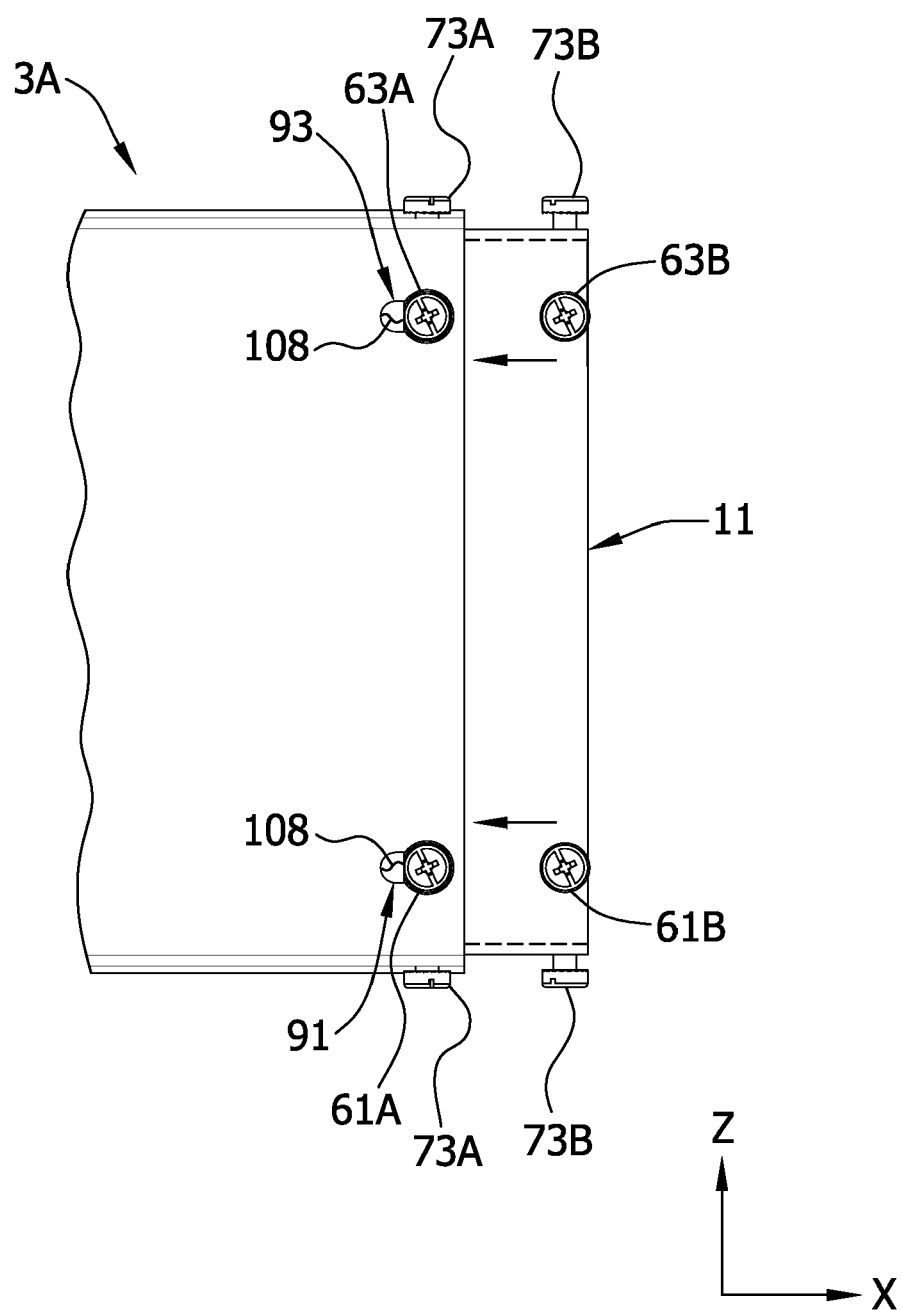
Figure 16:
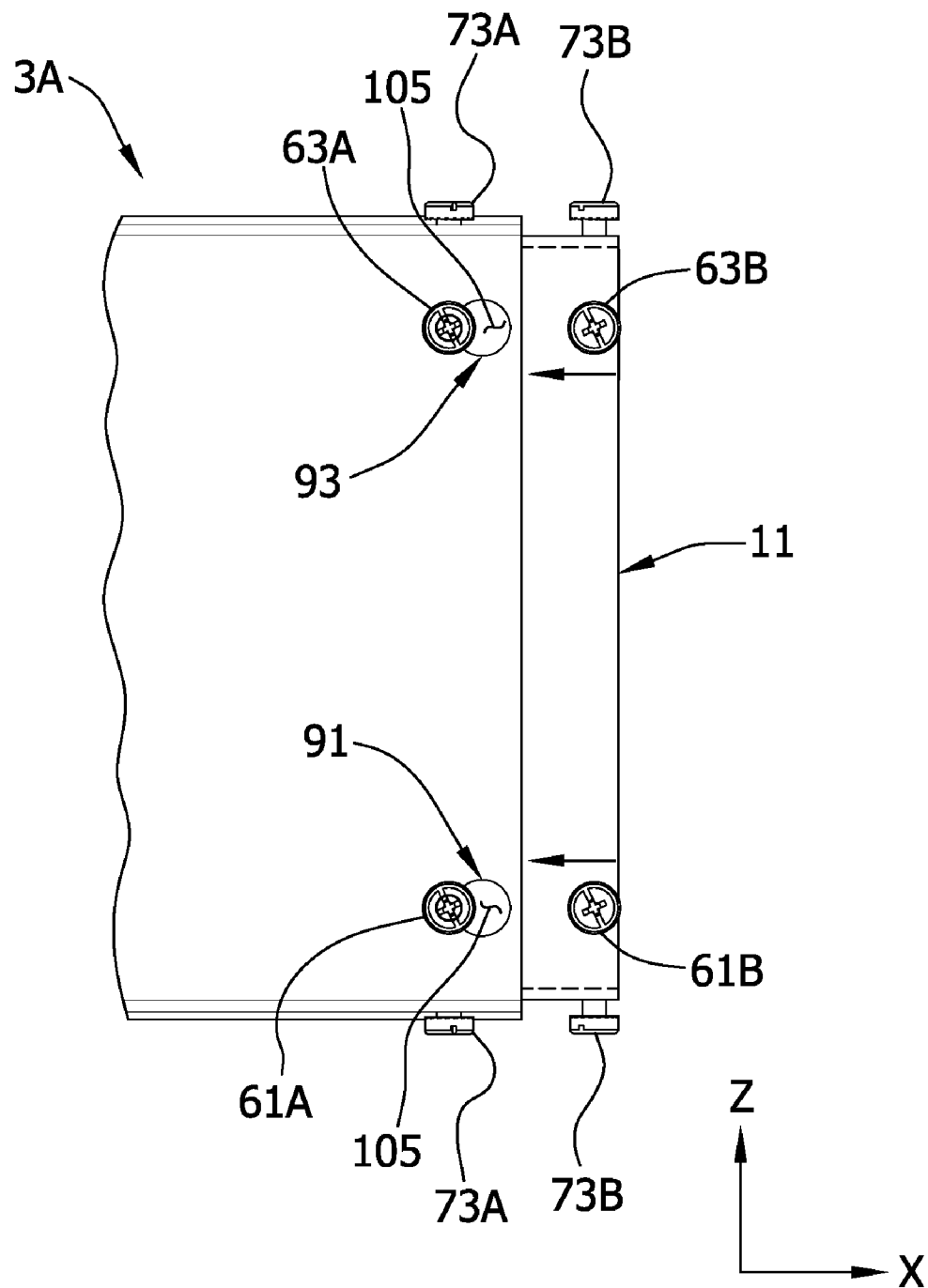
Figure 17:
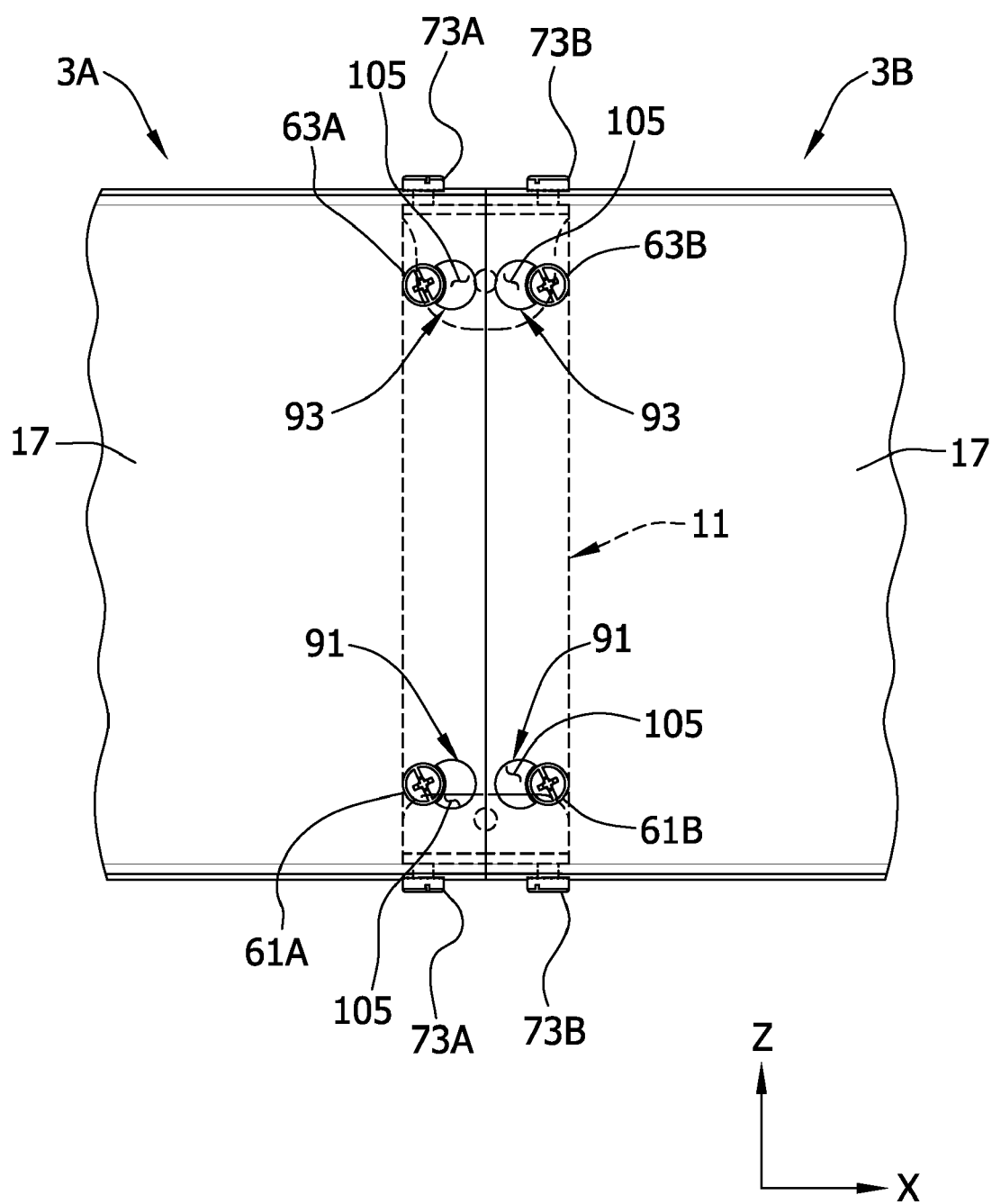

The upper and lower side wall slots 97, 99 in each side wall 19 of the wireway sections 3A, 3B are generally aligned along the Y-axis. As shown in FIG. 6, each of these slots 97, 99 extends from the end edge 29 of a respective side wall at the first end of the section for receiving a shank 85 of a respective side wall connector screw 71A, 71B, 73A, 73B. The side wall slot 97, 99 is configured such that a longitudinal centerline 115 of the slot has both X-axis and Y-axis components. In the embodiment of FIG. 6, each side wall slot 97, 99 comprises a first longitudinal slot portion 119 extending generally along the X-axis from the end edge 29 of the side wall 19 at the first end of the section, a second transverse slot portion 121 extending generally along the Y-axis from the first slot portion 119 toward the bottom wall 17 of the section, and a third longitudinal slot portion 123 extending generally along the X-axis from the second slot portion 121 toward a second end of the section opposite the first end. As measured along the centerline 115, the first longitudinal slot portion 119 of the slot 97, 99 has an X-dimension 131; the second transverse portion has a Y-dimension 133; and the third longitudinal slot portion has an X-dimension 135. The slot 97, 99 has an overall X-dimension 141 and an overall Y-dimension 143. Thus, in the depicted embodiment, the side wall slot 97, 99 has a non-linear or two-dimensional configuration which can be described as zig-zag or generally Z-shaped. Other configurations are possible in which the slot has both X-axis and Y-axis components (e.g., a linear slot inclined toward the bottom wall 17 of the wireway section). The width of each side wall slot 97, 99 is greater than the diameter of the shank 85 of a respective side wall connector screw so that the screw can move along the slot from one end to the other, and at least the third portion or segment 123 of the slot has a width less than the head of the screw. In the embodiment shown, the width dimension 131 of the slot is generally uniform along its entire length, but other configurations are possible.

The connector 11 and wireway sections 3A, 3B are configured such that when the connector is telescoped inside adjacent ends of the wireway sections during the connection process (described below), the side wall connector screws 71A, 71B, 73A, 73B of the connector align along the X-axis with respective side wall slots 97, 99 in the wireway sections. Further, at the end of the connection process, the side wall connector screws are positioned in the third portions 123 of the side wall slots. As a result, when the screws are tightened down, the heads of the screws will lock down against the side walls 19 of the wireway bodies 15.

FIGS. 7-17 illustrate a procedure for connecting the first and second wireway sections 3A, 3B end to end and in general longitudinal alignment along the X-axis.

The first step of the procedure is to thread all of the bottom screws 61A, 61B, 63A, 63B and side wall screws 71A, 71B, 73A, 73B into respective screw holes 55A, 55B, 57A, 57B, 65A, 65B, 67A, 67B of the connector 11. The connector 11 is then positioned (see FIG. 7) to align the first sets of upper and lower side wall screws 71A, 73A adjacent the first longitudinal (X-axis) end of the connector with respective upper and lower side wall slots 97, 99 in the first wireway section 3A. With the connector so positioned, the first end of the connector is telescoped into the interior of the first wireway section 3A along a path having X-axis and Y-axis components corresponding to the longitudinal centerline 115 of the side wall slots 97, 99. In the illustrated embodiment, this movement is accomplished by moving the first sets of side wall screws 71A, 73A of the connector generally along the X-axis along the first longitudinal portions 119 of respective side wall slots. During such movement, the bottom wall 45 of the connector 11 is spaced from the bottom wall 17 of the first wireway section 3A by a distance 151 (FIG. 8) sufficient to provide clearance for the first set of bottom wall screws 61A, 63A projecting down from the bottom wall 45 of the connector. When the side wall screws 71A, 73A reach the second portions 121 of the side wall slots 97, 99, the connector 11 and wireway section 3A are moved relative to one another generally along the Y-axis in the direction indicated by the arrows 125 shown in FIG. 9. During this movement, the first sets of side wall screws 71A, 73A move along the second portions 121 of respective side wall slots 97, 99 until the bottom walls 45, 17 of the connector 11 and first wireway section 3A are either immediately adjacent or (preferably) in contact with one another and the heads 81 of the bottom wall screws 61A, 63A on the connector 11 pass into and through the larger-dimension portions 105 of respective bottom wall slots 91, 93 in the first wireway section 3A (see FIG. 15). The connector 11 is then telescoped along the X-axis farther into the first wireway section 3A, during which movement the shanks 85 of the first sets of side wall screws 71A, 73A on the connector travel along the third longitudinal portions 123 of respective side wall slots 97, 99 in the wireway section and the shanks 85 of the first set of bottom wall screws 61A, 63A move along the second longitudinal portions 107 of respective bottom wall slots 91, 93 of the wireway section (see FIGS. 10 and 16). This movement continues until the ends of the first sets of connector screws reach the ends of respective slots in the first wireway section 3A, after which the side wall screws and bottom wall screws are tightened to bring the heads 85 of the screws into pressure contact with respective exterior surfaces of the bottom and side walls 17, 19 of the wireway section 3A to securely fasten the connector 11 to the section (see FIGS. 11 and 17).

After the connector has been secured to the first wireway section 3A, the above process is repeated to secure the connector 11 to the second wireway section 3B. That is, the connector is positioned to align the second set of upper and lower side wall screws 71B, 73B adjacent the second end of the connector with respective upper and lower side wall slots 97, 99 in the second wireway section 3B. With the connector so positioned, the second end of the connector 11 is telescoped into the interior of the second wireway section 3B along a path having X-axis and Y-axis components corresponding to the longitudinal centerline 115 of the side wall slots 97, 99. In the illustrated embodiment, this movement is accomplished by moving the second sets of side wall screws 71B, 73B of the connector generally in the X-direction along the first longitudinal portions 119 of respective side wall slots 97, 99 in the second wireway section 3B. During such movement, the bottom wall 45 of the connector is spaced from the bottom wall 17 of the second wireway section 3B by a distance substantially identical to the distance 151 in FIG. 8 and sufficient to provide clearance for the second set of bottom wall screws 61B, 63B projecting down from the bottom wall 45 of the connector. When the side wall screws 71B, 73B reach the second portions 121 of the side wall slots 97, 99, the connector 11 and second wireway section 3B are moved relative to one another generally along the Y-axis. During this movement, the second set of side wall screws 71B, 73B move along the second portions 121 of respective side wall slots 97, 99 until the bottom walls 45, 17 of the connector 11 and second wireway section 3B are either immediately adjacent or (preferably) in contact with one another and the heads 81 of the second set of bottom wall screws 61B, 63B on the connector pass into and through the larger-dimension portions 105 of respective bottom wall slots 91, 93 in the second wireway section. The connector 11 is then telescoped along the X-axis farther into the second wireway section 3B, during which the shanks 85 of the second set of side wall screws 71B, 73B on the connector move along the third longitudinal portions 123 of respective side wall slots 97, 99 in the second wireway section 3B and the shanks 85 of the second set of bottom wall screws 61B, 63B on the connector move along the second longitudinal portions 105 of respective bottom wall slots 91, 93 of the second wireway section 3B. This movement continues until the ends of the connector screws reach the ends of respective slots and, desirably, the ends of the first and second wireway sections abut or substantially abut one another (see FIG. 11). The second sets of side wall screws 71B, 73B and bottom wall screws 61B, 63B are then tightened to bring the heads 85 of the second sets of connector screws into pressure contact with the exterior surfaces of the bottom and side walls 17, 19 of the second wireway section 3B to securely fasten the connector to the second wireway section. When all sets of connector screws are fully tightened, the two wireway sections 3A, 3B are securely connected end to end (see FIGS. 11 and 17).

The above steps can be repeated using additional connectors 11 and additional wireway sections to make a wireway of any selected length.

It will be observed from the foregoing that the dimensions and configurations of the bottom wall slots 91, 93 and side wall slots 97, 99 in the wire sections 3A, 3B are coordinated to accomplish the desired connection. In particular, the Y-position of the first portion 119 each side wall slot 97, 99 is such that when a respective side wall connector screw is received in that slot portion, the bottom wall 45 of the connector is spaced from (above) the bottom wall 17 of a respective wire section 3A, 3B to provide clearance for the bottom wall connector screws as the connector is telescoped into the section. Further, the X-dimension 131 (FIG. 6) of the first portion 119 of each side wall slot should be such that when the respective side wall connector screw has moved to the end of that slot portion, it is aligned not only with the second portion 121 of the side wall slot but also the first portion 105 of a respective bottom wall slot. Also, the Y-dimension 133 of the second portion 121 of the side wall slot 97, 99 should be such when the connector screw reaches the lower end of that slot portion, the head 85 of the connector screw passes through the first portion 105 of the aligned bottom wall slot 91, 93 to a position in which the bottom wall 45 of the connector is immediately adjacent or in contact with the bottom wall 17 of a respective wire section. And still further, the X-dimension 135 (FIG. 6) of the first portion 119 of each side wall slot should be such that when the respective connector screw has moved to a final position toward (or at) the end of that slot portion, the connector screw is properly positioned in the narrower portion 108 of the bottom wall slot 91, 93 so that when the screw is tightened down, the head of the screw is forced against the bottom wall 17 of the wireway section to provide the clamping action necessary to secure the connector to the respective section. It will be understood that the specific slot configurations and dimensions used can vary.

It will be observed from the foregoing that quick-connect system of this invention can be used to connect wireway sections quickly, efficiently, and with only a minimum of parts using only a screw driver or other tool for tightening the connector screws. As a result, installation time is reduced. Further, since the screws and connector can be pre-assembled at the factory or in the field, the installer does not have to worry about fumbling with loose hardware. The wireway sections can be connected using only one hand, thereby increasing the convenience and safety of the process which is often carried out while the installer is standing on a ladder or other elevated support high above the floor.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawing[s] shall be interpreted as illustrative and not in a limiting sense.

What is claimed is:

1. A quick-connect system for connecting sections of wireway, comprising first and second wireway sections, each wireway section having a length along an X-axis, a height along a Y-axis and a width along a Z-axis, each wireway section defining an interior space for placement of wire, and a connector for connecting the first and second wireway sections in generally longitudinal alignment along said X-axis, said connector having a length along the X-axis, a height along the Y-axis and a width along the Z-axis, and said connector comprising a bottom wall and opposing side walls configured to overlap adjacent ends of the first and second wireway sections, and at least one set of two spaced apart and longitudinally aligned screw holes in each of the bottom and side walls of the connector for receiving connector screws, each of said first and second wireway sections comprising a bottom wall, at least one bottom wall slot extending from said interior space through the bottom wall of the section generally adjacent a first end of the section for receiving a respective connector screw, said at least one bottom wall slot comprising a first portion toward said first end of the section for receiving a head of the connector screw and a second portion farther away from said first end of the section for receiving a shank of the screw, a pair of side walls extending up from the bottom wall, at least one side wall slot extending from said interior space through each side wall generally adjacent said first end of the section for receiving a shank of a respective connector screw, said at least one side wall slot extending from an end edge of the side wall and being configured such that a longitudinal centerline of the slot has both X-axis and Y-axis components, wherein said connector is sized for a telescoping fit inside adjacent ends of the first and second wireway sections, the side wall slots in the wireway sections being configured to permit movement of the connector relative to the wireway sections along paths having X-axis and Y-axis components as the connector is telescoped inside adjacent ends of the first and second wireway sections, and wherein said at least one side wall slot comprises a first longitudinal slot portion extending generally along said X-axis from said end edge of the side wall at the first end of the section, a second transverse slot portion extending generally along said Y-axis from the first slot portion toward the bottom wall of the section, and a third longitudinal slot portion extending generally along said X-axis from the second slot portion toward a second end of the section.

2. A quick-connect system as set forth in claim 1 further comprising connector screws in the screw holes in each of the bottom and side walls of the connector, said at least one side wall slot in each side wall of the section being configured such that when a respective connector screw is in said first longitudinal slot portion the bottom wall of the connector is spaced away from the bottom wall of the section by a distance sufficient to provide clearance for the connector screw in the bottom wall screw hole of the connector, and when the respective connector screw is in said third longitudinal slot portion the bottom wall of the connector is closer to the bottom wall of the section.

3. A quick-connect system as set forth in claim 1 wherein the first portion of the at least one bottom wall slot is wider along said Z-axis than the second portion of the slot.

4. A quick-connect system as set forth in claim 1 wherein the at least one bottom wall slot has closed ends.

5. A quick-connect system as set forth in claim 1 wherein said connector screw holes are threaded.

6. A quick-connect system as set forth in claim 1 wherein said connector is sized to fit inside of adjacent ends of said first and second wireway sections.

7. A quick-connect system as set forth in claim 6 wherein the bottom and side walls of the connector have an exterior contour essentially identical to an interior contour of the bottom and side walls of each wireway section.

8. A quick-connect system as set forth in claim 1 wherein adjacent ends of the first and second wireway sections substantially abut one another when the sections are connected by the connector.

9. A quick-connect system as set forth in claim 1 further comprising screws in said screw openings.

10. A quick-connect system as set forth in claim 9 wherein said connector screw holes are threaded.

11. A wireway section having a length along an X-axis, a height along a Y-axis and a width along a Z-axis, the wireway section defining an interior space for placement of wire, said wireway section comprising a bottom wall, at least one bottom wall slot extending from said interior space through the bottom wall of the section for receiving a respective screw of a connector, said bottom wall slot comprising a wider portion adjacent a first end of the section for receiving a head of the screw and a narrower portion farther away from the first end of the section for receiving a shank of the screw, a pair of side walls extending up from the bottom wall, at least one side wall slot extending from said interior space through each side wall for receiving a shank of a respective connector screw, said at least one side wall slot extending from an end edge of the side wall and being configured such that a longitudinal centerline of the slot has both X-axis and Y-axis components, and wherein said at least one side wall slot comprises a first longitudinal slot portion extending generally along said X-axis from said end edge of the side wall at the first end of the section, a second transverse slot portion extending generally along said Y-axis from the first slot portion toward the bottom wall of the section, and a third longitudinal slot portion extending generally along said X-axis from the second slot portion toward a second end of the section.

12. A wireway section as set forth in claim 11 wherein said at least one side wall slot in each side wall is configured such that when a respective connector screw of the connector is in said first longitudinal slot portion of the section a bottom wall of the connector is spaced away from the bottom wall of the section by a distance sufficient to provide clearance for a connector screw in a bottom wall screw hole of the connector, and when the respective connector screw is in said third longitudinal slot portion the bottom wall of the connector is closer to the bottom wall of the section.

13. A wireway section as set forth in claim 11 wherein the at least one bottom wall slot has closed ends.

14. A wireway section defining an interior space for placement of wire, said wireway section having a length along an X-axis, a height along a Y-axis and a width along a Z-axis, comprising a bottom wall, at least one bottom wall slot extending from said interior space through the bottom wall of the section generally adjacent a first end of the section for receiving a screw of a connector adapted to connect said wireway section to an adjacent wireway section, said at least one bottom wall slot comprising a wider portion toward said first end of the section for receiving a head of the screw and a narrower portion farther away from said first end of the section for receiving a shank of the screw, a pair of side walls extending up from the bottom wall, and at least one open-end side wall slot extending from said interior space through each side wall adjacent said first end of the section for receiving the shanks of screws of said connector, said at least one open-end side wall slot extending from a first location at an end edge of the side wall to a second location closer to the bottom wall, and wherein said at least one side wall slot comprises a first longitudinal slot portion extending generally along said X-axis from said end edge of the side wall at the first end of the section, a second transverse slot portion extending generally along said Y-axis from the first slot portion toward the bottom wall of the section, and a third longitudinal slot portion extending generally along said X-axis from the second slot portion toward a second end of the section.

15. A wireway section as set forth in claim 14 wherein said at least one side wall slot in each side wall is configured such that when a respective connector screw of the connector is in said first longitudinal slot portion of the section a bottom wall of the connector is spaced away from the bottom wall of the section by a distance sufficient to provide clearance for a connector screw in a bottom wall screw hole of the connector, and when the respective connector screw is in said third longitudinal slot portion the bottom wall of the connector is closer to the bottom wall of the section.

16. A method of connecting first and second wireway sections, each wireway section having a length along an X-axis, a height along a Y-axis and a width along a Z-axis, each wireway section defining an interior space for placement of wire, said method comprising (a) aligning a first set of side wall screws adjacent a first end of a connector with a first set of side wall slots extending from said interior space through respective side walls of the first wireway section, each side wall slot in the first wireway section comprising a first longitudinal slot portion extending generally along said X-axis from an end edge of the side wall at a first end of the wireway section, a second transverse slot portion extending generally along said Y-axis from the first slot portion toward a bottom wall of the wireway section, and a third longitudinal slot portion extending generally along said X-axis from the second slot portion toward a second end of the wireway section, (b) telescoping the connector into the first wireway section by moving the side wall screws along lengths of respective side wall slots, said movement causing the connector to move along a path corresponding to said first, second and third portions of the side wall slots in the first wireway section to bring a first bottom wall screw on the connector into a bottom wall slot extending from said interior space through a bottom wall of the first wireway section, (c) tightening the side wall screws of the first set and the first bottom wall screw to fasten the connector to the first wireway section, (d) aligning a second set of side wall screws adjacent a second end of a connector with a second set of corresponding side wall slots extending from said interior space through respective side walls of the second wireway section, each side wall slot in the second wireway section comprising a first longitudinal slot portion extending generally along said X-axis from an end edge of the side wall at a first end of the wireway section, a second transverse slot portion extending generally along said Y-axis from the first slot portion toward a bottom wall of the wireway section, and a third longitudinal slot portion extending generally along said X-axis from the second slot portion toward a second end of the wireway section, (e) telescoping the connector into the second wireway section by moving the side wall screws of the second set along lengths of respective side wall slots, said movement causing the connector to move along a path corresponding to said first, second and third portions of the side wall slots in the second wireway section to bring a second bottom wall screw on the connector into a bottom wall slot extending from said interior space through a bottom wall of the second wireway section, and (f) tightening the side wall screws of the second set and the second bottom wall screw to fasten the connector to the second wireway section.

17. A method as set forth in claim 16 further comprising threading said side wall and bottom wall screws into respective screw holes of the connector before the aligning step (a).

\* \* \* \* \*